United States Patent
Wu et al.

(10) Patent No.: US 6,252,016 B1
(45) Date of Patent: Jun. 26, 2001

(54) CONTINUOUS POLYMERIZATION IN A NON-CYLINDRICAL CHANNEL WITH TEMPERATURE CONTROL

(75) Inventors: Richard Shu-Hua Wu, Fort Washington; Jill Ann Wudarski, Philadelphia; James Szkolnick Kempner, Southampton, all of PA (US)

(73) Assignee: Rohm and Haas Company, Phila., PA (US)

( * ) Notice: Subject to any disclaimer, the term of this patent is extended or adjusted under 35 U.S.C. 154(b) by 0 days.

(21) Appl. No.: 09/391,840

(22) Filed: Sep. 8, 1999

Related U.S. Application Data (63) Continuation-in-part of application No. 09/208,548, filed on Dec. 9, 1998, now abandoned.
(60) Provisional application No. 60/099,903, filed on Sep. 11, 1998, and provisional application No. 60/068,177, filed on Dec. 19, 1997.

(51) Int. Cl.[7] ................. C08F 2/01; C08F 2/04; C08F 2/12
(52) U.S. Cl. ............... 526/64; 526/88; 526/918; 422/138; 422/134
(58) Field of Search .............. 526/61, 64, 918, 526/88; 422/138, 200, 201, 202, 204, 134

(56) References Cited

U.S. PATENT DOCUMENTS 5,268,437 * 12/1993 Holy et al. ............... 526/229

FOREIGN PATENT DOCUMENTS

02004803 * 1/1990 (JP) ................. C08F/2/02

* cited by examiner

*Primary Examiner*—David W. Wu
*Assistant Examiner*—Kelechi Egwim
(74) *Attorney, Agent, or Firm*—Gary D. Greenblatt (57) ABSTRACT

A continuous process for preparing polymers is disclosed. The continuous process includes the steps of continuously feeding a reaction mixture containing a monomer into a non-cylindrical channel, continuously controlling the temperature of the non-cylindrical channel by exposing the surface of the non-cylindrical channel not exposed to the monomer to a temperature control medium, polymerizing the monomer in the non-cylindrical channel, and continuously removing the polymer from the non-cylindrical channel. The continuous process is suitable for the preparation of polymers containing ethylenically unsaturated monomers as polymerized units by emulsion polymerization, solution polymerization, and suspension polymerization.

18 Claims, 1 Drawing Sheet reaction mixture temperature control medium

CONTINUOUS POLYMERIZATION IN A NON-CYLINDRICAL CHANNEL WITH TEMPERATURE CONTROL

This application is a continuation-in-part application of patent application Ser. No. 09/208,548, filed Dec. 9, 1998, now abandoned, which in-turn claims priority from provisional application No. 60/099,903, filed Sep. 11, 1998, and provisional application No. 60/068,177, filed Dec. 19, 1997.

This invention relates to a process for preparing polymers, in particular to a continuous process for preparing polymers.

Polymers are typically commercially prepared in batch processes. Batch processes require several hours, in some cases greater than eight hours, to feed the reactants, including monomer or monomers into the reactor, conduct the polymerization reaction, cool the resulting polymer, remove the polymer, and clean the reactor. The equipment required for batch processes typically includes reactors which can hold up to 75,000 liters and may cost more than $1,000,000 per reactor. Despite these disadvantages, batch processes do have some advantages, such as providing polymer products with narrow particle size distributions. By narrow particle size distribution is meant that the polydispersity index as measured by an instrument, such as the Matec Applied Sciences CHDF-1100 Eluant Delivery System is less than 2.0. Generally, polymer products with polydispersity indexes greater than 2.0 are not desired due to negative effects on rheology and application performance.

To improve the deficiencies of the batch processes, continuous polymerization processes have been developed. Continuous polymerization processes are potentially more efficient than a batch process. In a continuous process, monomer and other reactants are continuously fed into and through the reactor while, at the same time, polymer is continuously removed from the reactor. A continuous process may produce more product per day, utilizing smaller, less expensive reactors. Continuous processes utilizing continuous stirred tank reactors or tubular reactors are two types of continuous processes.

A continuous stirred tank reactor is a single stirred tank type reactor in which monomers and other reactants are continuously fed into the reactor while polymer is continuously removed from the reactor. The tank type reactor used in this continuous process is similar to the reactors used in a batch process except that because the process is continuous, the capacity of the reactor can be much less. A continuous stirred tank reactor train process is made up of two or more stirred tank reactors connected in series. Monomer and other reactants can be continuously fed into the first reactor and partially reacted. The contents of the first reactor are continuously fed to a second reactor where they may be further reacted. Additional monomer and reactants may be continuously fed to the second reactor. The contents of the second reactor may be continuously fed to a third reactor and so on. Continuous stirred tank reactors have an advantage over the batch process of utilizing less costly equipment because of the ability to use reactors with less capacity, yet still obtain the same output in the same or shorter reaction times. However, because some of the contents of the reactors are back-mixed during the continuous feeding of materials from one reactor to the next, leading to extended retention time of some of the reactants in the process, continuous stirred tank reactor processes tend to yield polymers with particle size distributions having polydispersity indexes of greater than 2.0. This is due to the wide retention time distribution of some of the reactants in the process.

Other attempts have been made to continuously polymerize monomers through the use of tubular reactors. Tubular reactors consist of a cylindrical channel immersed in a temperature control medium. Reactant is fed in one end of the tubular reactor and polymerized inside the tubular reactor, and polymer is removed from the other end of the tubular reactor. In order to facilitate good heat exchange between the temperature control medium and the reactant, the cylindrical channel must be narrow, typically from 1 to 15 cm in diameter. In addition, the flow rate must be balanced to eliminate plugging, yet yield sufficient heat exchange for the polymerization to occur.

Tubular reactors have been used in polymerization processes to yield polymers with particle size distributions having polydispersity indexes of less than 2.0. However, because of the narrow cylindrical channel and the need to expose the reaction mixture to the heated walls for a specified residence time to facilitate complete polymerization, tubular reactors, when used to make polymers, need to be long. In some cases, the length of the tubular reactor has been extended to greater than 200 meters. The long, narrow tubular reactors have consistent problems with plugging of the tubes if the flow rate is not right. There have been attempts to solve this problem by increasing the flow rate of the reaction mixture, but the increased flow rate further increases the need to extend the length of the tubular reactor for sufficient residence time and heat transfer.

U.S. Pat. No. 4,713,434 ('834) attempts to solve the plugging problem of tubular reactors. This patent discloses a tubular reactor for continuous emulsion polymerization where the internal surface of the tube is lined with a saturated polyolefin. The saturated polyolefin may be a fluorinated saturated polyolefin. Although this patent resolves the issue of plugging, it does not solve the problem of inefficient heat transfer. This tubular reactor is still required to be on the order of 70 meters long.

Therefore, there is a need for a continuous process utilizing a reactor that has better heat transfer efficiency than a tubular reactor and that is non-plugging. In addition, as an added benefit there is a need for a continuous process which provides polymers with particle size distributions of 2.0 or less.

We have found a continuous process for preparing polymers that meets this need. The present invention is a continuous process for preparing polymers including continuously feeding a reaction mixture containing at least one monomer to at least one non-cylindrical channel, continuously controlling the temperature of the non-cylindrical channel by exposing the surface of the non-cylindrical channel not exposed to the reaction mixture containing at least one monomer to a temperature control medium, polymerizing the monomer in at least one non-cylindrical channel and continuously removing polymer from at least one non-cylindrical channel. By "non-cylindrical" it is meant any shape whereby the reactant is exposed to a greater surface area for a given length than a cylindrical shape. Suitable non-cylindrical shapes of the channel are for example, oval, ellipse, square, triangular, and flat.

The surface of the one or more non-cylindrical channels not exposed to the reaction mixture containing at least one monomer can be exposed to a temperature control medium. The temperature control medium may be a solid, gas or liquid. A typical gas medium may be applied by simply exposing the non-cylindrical channel to air. Liquid medium may be for example, water, brine, or glycol solvents such as ethylene glycol, diethylene glycol, propylene glycol, dipropylene glycol, and the like. Solid medium may be for example an electrically heated metal plate. It is preferable that the temperature control medium be a liquid.

The process may be operated at any temperature. The temperature typically ranges from 0 to 350° C., preferably 1 to 200° C., more preferably 3 to 100° C. The process may be operated under vacuum as low as 25 mm Hg, or at pressures up to 5,000 psi. The flow rate through the channel for the process may range from 50 ml/min to 750 L/min.

The non-cylindrical channels can be immersed in the temperature control medium by methods known in the art such as simply exposing to air, placing them in a forced air oven or placing them in a bath containing liquid or solid temperature control medium. However, it is preferable that the temperature control medium flows through separate, alternating channels to the non-cylindrical channels in which the reaction mixture containing at least one monomer flows. By alternating, it is meant that the channel next to a non-cylindrical channel in which the reaction mixture containing at least one monomer flows, contains temperature control medium. The non-cylindrical channels may share a common wall, or the non-cylindrical channels may have separate walls so long as the non-cylindrical channels are close enough together to provide sufficient temperature control to polymerize the monomer. It is further preferable that the flow of the temperature control medium be opposite to the flow of the reaction mixture containing at least one monomer to accomplish maximum heat transfer.

Figure 1:
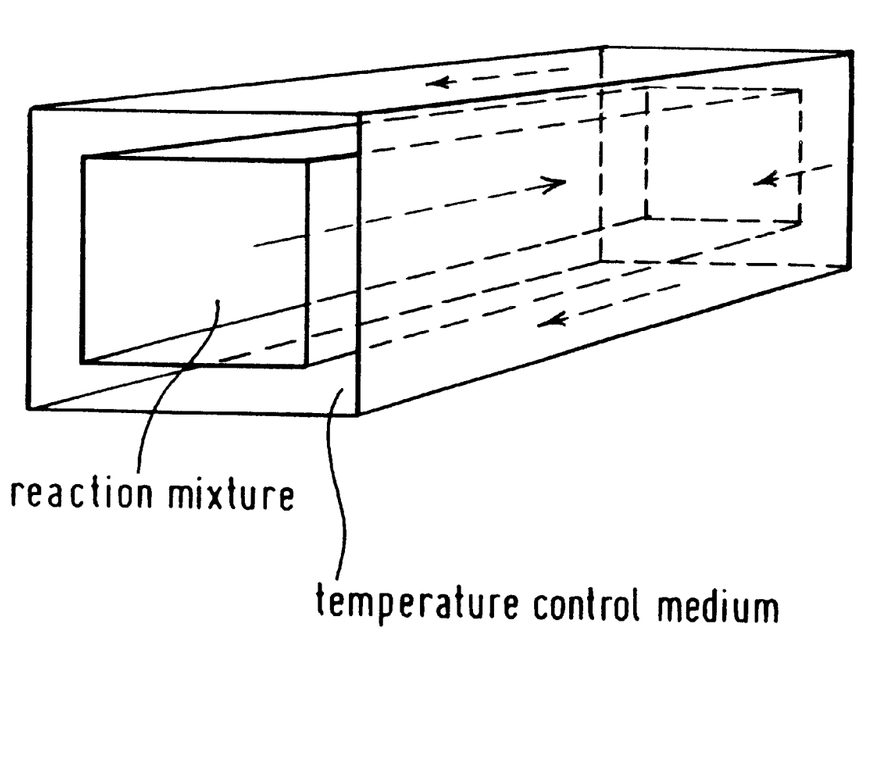
FIG. 1 shows a simple embodiment of the apparatus for carrying out the process of the present invention, including the non-cylindrical channel with a surface, which is not exposed to the reaction mixture, exposed to a temperature control medium. In this embodiment, the flow of the temperature control medium is opposite to the flow of the reaction mixture.

The width of the non-cylindrical channels and the contact of the reaction mixture containing at least one monomer with the surface of the non-cylindrical channels are such that efficient heat transfer takes place between the reaction mixture containing at least one monomer and the non-cylindrical channel's surface to cause the monomer to polymerize. Further, because the reaction mixture containing at least one monomer in the non-cylindrical channel is exposed to a greater surface area for any given length as compared to cylindrical reactors, the reaction mixture containing at least one monomer can have a shorter residence time in the non-cylindrical channel than in a cylindrical reactor, have efficient heat transfer take place and yield a comparable polymer product.

The non-cylindrical channels may be constructed of any material suitable for forming into the non-cylindrical shape and capable of providing sufficient heat transfer when exposed to a temperature control medium. Such materials are for example plastics such as polycarbonate and polypropylene, stainless-steel types 304 and 316; titanium, Monel, Incoloy 825, Hastelloy C, phosphor bronze, and cupronickel. In addition, the portion of the non-cylindrical channel exposed to the reaction mixture containing at least one monomer may be coated with materials such as graphite or polytetrafluoroethylene to aid in flow.

When more than one non-cylindrical channel is used, the non-cylindrical channels may be the same or different length and may be run in series or in parallel. Each non-cylindrical channel may also be run at different reaction conditions, such as at different temperature and pressure conditions.

A reaction mixture containing at least one monomer is fed to the non-cylindrical channels and flows through the non-cylindrical channels, preferably alternating with the temperature control medium. The reaction mixture containing at least one monomer flows through the non-cylindrical channels at a rate sufficient to polymerize the monomer. In instances where a polymer product with a low polydispersity index is desired, the residence time of the reaction mixture containing at least one monomer is sufficient to yield a polydispersity index of less than 2.0. The residence time is typically less than 30 minutes, preferably less than 20 minutes. The flow rate may be adjusted based on the desired residence time in the non-cylindrical channels and the total surface area of the non-cylindrical channels. In general, the higher the total surface area of the non-cylindrical channels, the faster the flow rate may be. The polymer is continuously removed through an outlet of the non-cylindrical channels.

The non-cylindrical channel can have one or more inlets. The reaction mixture containing at least one monomer may be fed into an inlet to the non-cylindrical channel which has a different inlet within the non-cylindrical channel, allowing a different reaction mixture containing at least one monomer to be fed at a different point in the process. Where more than one non-cylindrical channel is used, the reaction mixture containing at least one monomer may be fed through a series of non-cylindrical channels, for example the reaction mixture containing at least one monomer may be fed through one non-cylindrical channel into a connected non-cylindrical channel. There may be inlets between the connected non-cylindrical channels to allow a different reaction mixture containing at least one monomer to be fed at a different point in the process to a separate non-cylindrical channel. The different non-cylindrical channels may be run at different temperature and pressure conditions. The reaction mixture containing at least one monomer may also be fed into inlets in parallel non-cylindrical channels, whereby the reaction mixture containing at least one monomer flows through multiple non-cylindrical channels at the same time. The parallel non-cylindrical channels may have different inlets within the non-cylindrical channels, allowing a different reaction mixture containing at least one monomer to be fed at a different point in the process to separate non-cylindrical channels. The non-cylindrical channels may be run at different temperature and pressure conditions. The non-cylindrical channels may have one or more outlets. The polymer may be removed from the outlet of the non-cylindrical channel, or the polymer may be fed from the outlet of one non-cylindrical channel into one or more inlets of separate non-cylindrical channels.

The process may be used to prepare any type of polymerization, for example emulsion polymerizations, solution polymerizations, or suspension polymerizations. The polymerizations may occur through addition or condensation reactions. Addition reactions include free radical, anionic, and cationic polymerizations. Emulsion polymerizations prepared by the process of this invention can be single stage or multi-stage. For multi-stage emulsion polymers, a first monomer emulsion may be polymerized in a non-cylindrical channel and a second monomer emulsion may be fed either into a port in the non-cylindrical channel, or into a port before or in a second connected non-cylindrical channel. The first stage may also be pre-polymerized so that both the first stage and the second monomer emulsion are fed to a single non-cylindrical channel. More flexibility in the process may be achieved by connecting a third, fourth, or fifth non-cylindrical channel either in a series or in parallel to the process.

The non-cylindrical channel and alternating channels for the temperature control medium can be for example, certain types of heat exchangers such as plate-frame, plate-fin, and spiral-plate heat exchangers. Some of these heat exchangers are commercially available. The plate-frame heat exchanger consists of standard plates which may be flat or corrugated. Corrugated plates are preferred due to improved mixing of the monomer with the other reactants. The plates serve as heat exchange surfaces and may be made of stainless-steel types 304 and 316; titanium, Monel, Incoloy 825, Hastelloy C, phosphor bronze, and cupronickel. The plates may be coated with materials such as graphite or polytetrafluoroethylene. The plates form alternating non-cylindrical channels for the reaction mixture containing at least one monomer and the temperature control medium to flow through. The plates are supported by a frame. Gaskets prevent leakage where the plate and frame meet. The frame may be made of clad stainless steel and enamel-coated mild steel.

The plate-fin heat exchanger is similar to the plate-frame heat exchanger, but has a stack of layers, each consisting of a corrugated fin between flat metal sheets. The sheets are sealed off on two sides by channels or bars to form passages for the flow of the reaction mixture containing at least one monomer and the temperature control medium. The temperature control medium may flow counter-current to or concurrent with the reaction mixture containing at least one monomer.

The spiral-plate heat exchanger is made from a pair of plates rolled to provide long rectangular passages for the temperature control medium and the reaction mixture containing at least one monomer in counter-current or cocurrent flow.

The reaction mixture containing at least one monomer may be a mixture of at least one monomer and at least one initiator and solvent. Suitable solvents include, but are not limited to acetone, water, ethanol, methanol, butanol, isopropanol, propylene glycol monobutyl ether, ethylene glycol monobutyl ether, methylethyl ketone, dimethylformamide, and dimethylsulfoxide. Where emulsion polymerization is desired, surfactant may be combined with the monomer, the initiator, and water. By surfactant is meant a compound which reduces surface tension when dissolved in water or water solutions, or which reduces interfacial tension between two liquids, or between a liquid and a solid. Included in surfactants are detergents, wetting agents, and emulsifiers. Suitable surfactants include, but are not limited to anionic and nonionic emulsifiers such as alkali and ammonium alkyl sulfates, for example sodium lauryl sulfate, alkyl sulfonic acids, fatty acids, and oxyethylated alkyl phenols. The amount of surfactant used is typically 1 to 6% by weight, based on the weight of total monomer. The amount of water used is typically from 5 to 90% by weight, based on the weight of total monomer. The surfactant and water may also may be used in downstream dilutions of polymer emulsions made from the monomer emulsions.

Suitable monomers include ethylenically unsaturated monomers such as, for example, acrylic esters such as methyl (meth)acrylate, ethyl acrylate, butyl (meth)acrylate, 2-ethylhexyl acrylate, decyl (meth)acrylate, hydroxyethyl (meth)acrylate, and hydroxypropyl (meth)acrylate; acrylamide or substituted acrylamides; styrene or substituted styrenes; ethylene, propylene, butadiene; vinyl acetate or other vinyl esters; vinyl monomers such as vinyl chloride, vinylidene chloride, N-vinyl pyrolidone; and acrylonitrile or methacrylonitrile. Copolymerizable ethylenically unsaturated acid monomers such as, for example, (meth)acrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, maleic anhydride and salts thereof may also be used. Preferred monomers are butyl acrylate, ethyl acrylate, 2-ethyl hexylacrylate, methyl methacrylate, styrene, and vinyl acetate. More preferred monomers are butyl acrylate, methyl methacrylate, and vinyl acetate. By (meth)acrylate is meant both acrylate and methacrylate monomers.

Electrolytes such as sodium hydroxide, sodium phosphate, disodium phosphate, sodium carbonate, and ammonia may be added to the reaction mixture containing at least one monomer. The electrolyte may be added at from 0.1 to 15 percent based on the total weight of the monomers in the reaction mixture.

A chelating agent such as ethylenediamine tetraacetic acid may also be added to the reaction mixture containing at least one monomer. The chelating agent may be added at from 0.01 to 2 percent based on the total weight of the monomers in the reaction mixture.

The method of initiation is not critical to the process of the invention. Preferably, initiation is effected through the use of thermal or redox initiation. Conventional free radical initiators such as, for example, peroxygen compounds including inorganic persulfate compounds such as ammonium persulfate, potassium persulfate, and sodium persulfate; peroxides such as hydrogen peroxide; organic hydroperoxides such as cumene hydroperoxide and t-butyl hydroperoxide; organic peroxides such as benzoyl peroxide, acetyl peroxide, lauroyl peroxide, peracetic acid, and perbenzoic acid (sometimes activated by a water-soluble reducing agent such as a ferrous compound or sodium bisulfite); as well as other free-radical producing materials such as 2,2'-azobisisobutyronitrile may be used, typically at a level of 0.05% to 3% by weight, based on the weight of total monomer. Redox systems using the same initiators coupled with a suitable reductant (activator) such as, for example, isoascorbic acid, sodium sulfoxylate formaldehyde, and sodium bisulfite may be used at similar levels. Ferrous sulfate and other metal ions can be used as promoters at similar levels. Other suitable methods of initiation such as the use of irradiation with Ultra Violet light, electron beam irradiation, gamma irradiation, Ultrasonic, or mechanical means to induce free-radical generation are deemed to be within the scope of this invention.

For an emulsion polymerization, the monomer emulsion must not phase separate or otherwise become unstable in a manner that interferes with the efficiency of the polymerization reaction. In cases where the monomer emulsion has the tendency to become unstable before polymerization, it can be pre-mix pre-mixed and thus stabilized before being fed to the non-cylindrical channel. A mixer such as a static mixer or pre-mixer may be used in the process for this purpose.

Compositions which have narrow particle size distributions due to residence times of less than 30 minutes can be prepared by the process of this invention. By narrow particle size distribution is meant that the polyclispersity index as measured by an instrument, such as the Matec Applied Sciences CHDF-1100 Eluant Delivery System is less than 2.0, preferably less than 1.50.

The following examples illustrate a continuous polymerization process. Abbreviations used throughout are:

g=grams
%=percent
n=normal

° C.=degrees Centigrade
DI=deionized
mm=millimeters
Hg=Mercury
ml=milliliters
min=minutes
nm=nanometers
ml/min=milliliters per minute
L=liters For all Examples, monomer emulsions were prepared by admixing butyl acrylate, methyl methacrylate, methacrylic acid, an anionic surfactant, an electrolyte, a chelating agent, and water in a vessel. The admixture was stirred until an emulsion was formed.

EXAMPLE#1

A monomer emulsion was fed from a 7.6 L monomer emulsion tank to a heated bath equipped with a coil to provide residence time for the monomer emulsion, thermocouples on both the water and the emulsion side, a coiled heating element, a Thermolyne Type 1000 stir plate and heater, and a magnetic stir bar. The feed tank was equipped with a funnel, a dip pipe, an agitator (type GT21-18, #M1108280, 6,000 RPM maximum), cooling capability, and a weigh scale. The emulsion in the feed tank was constantly agitated in order to insure homogeneity. A catalyst solution was prepared by combining the following materials: 20.4 g ammonium persulfate, 659.6 g DI water, and 0.09 g ferrous sulfate heptahydrate. The solution was mixed well and fed to a 1 L catalyst feed tank. An activator solution was prepared by combining the following materials: 10.2 g sodium sulfoxylate formaldehyde and 329.9 g DI water. The solution was mixed well and fed to a 1 L activator feed tank.

Water was heated to 65° C. The water was pumped through the process lines in order to heat the system. The water entered the bottom of the heat exchanger, and flowed upward through the heat exchanger. The temperature for the "water-side" of the reactor was then set. For a redox process, the water was set to 55° C. Tempered water flow through the "water-side" was begun. The reactor temperature was allowed to equilibrate.

While DI water was still flowing through the process lines, a pump was turned on to 8.0 ml/min to feed the catalyst solution. A pump was turned on to 4.0 ml/min to feed the activator solution. The feeds were checked with graduated cylinders and stop watches to make sure that the feeds were accurate. The DI water flow was turned off. The monomer emulsion feed was begun with a pump. The feed rate of the monomer emulsion was adjusted to 200 ml/min. A first pre-mixer was set to a speed such that a stable monomer emulsion was produced. A static mixer was then used to mix the catalyst and activator solutions with the monomer emulsion. The temperature of the water in the heating bath was adjusted to insure that the temperature of the reaction mixture at the heat exchanger inlet was approximately 60° C. The reaction mixture was continuously fed to an Alfa Laval plate-frame heat exchanger (Model Type M6-MFG). The monomer was polymerized in the heat exchanger. Polymer was continuously removed from the heat exchanger and collected in a 19 L final product holding tank. Samples were added to vials which contained a pre-weighed amount of hydroquinone inhibitor.

When the monomer emulsion, catalyst, and activator feeds were depleted, warm soapy water was pumped through the system in order to flush out any remaining emulsion. This was continued until the exiting liquid was clear. The unit was drained and the volume of water that was obtained was recorded. A volume of approximately 880 ml indicated no fouling.

Results

A coagulate-free, stable emulsion with a 16.5% solids content and a mean weight average particle diameter of 126 nm was obtained. The polydispersity of the final product was 1.35. Reaction at the end of the reactor totaled 42.9%. The mean residence time in the reactor at the total flow rate of 212 ml/min was approximately 7 minutes based on salt tracer studies. For the salt tracer studies, water was pumped through the heat exchanger at 200 ml/min. At time 0, a 5% solution of aqueous sodium chloride was injected into the heat exchanger. The effluent from the heat exchanger was monitored by a conductivity detector. The difference between time 0 and the time at which the sodium chloride solution was detected indicated the residence time of the solution in the heat exchanger. The volume of water drained from the emulsion side of the heat exchanger was measured as 891.2 ml signifying that no fouling occurred during the run. Had there been plugging, the volume of water drained would have been lower than 880 ml.

EXAMPLE#2

For this Example, the same equipment as in Example 1 was used, except that the pre-mixer was removed. A monomer emulsion was fed to the heated bath. The emulsion in the feed tank was constantly agitated in order to insure homogeneity. The catalyst solution was prepared by combining the following materials: 47.6 g ammonium persulfate, 904.4 g DI water, and 0.085 g ferrous sulfate heptahydrate. The solution was mixed well and fed to the catalyst feed tank. The activator solution was prepared by combining the following materials: 15.7 g sodium sulfoxylate formaldehyde and 507.9 g DI water. The solution was mixed well and fed to the activator feed tank.

Water was heated to 80° C. The water was pumped through the process lines in order to heat the system. The temperature for the "water-side" of the reactor was then set. For a thermal process, the water was set to 70° C. Tempered water flow through the "water-side" was begun. The reactor temperature was allowed to equilibrate.

While DI water was still flowing through the process lines, the catalyst pump was turned on to 11.2 ml/min. The activator pump was turned on to 3.7 ml/min. The feeds were checked with graduated cylinders and stop watches to make sure that the feeds were accurate. The DI water flow was turned off. The monomer emulsion feed was begun. The feed rate of the monomer emulsion was adjusted to 200 ml/min. The temperature of the water in the heating bath was adjusted to insure that the temperature of the emulsion at the heat exchanger inlet was approximately 80° C. The monomer emulsion was fed continuously to the heat exchanger. The monomer was polymerized in the heat exchanger. Polymer was continuously removed from the heat exchanger and collected in the final product holding tank. Samples were added to vials which contained a pre-weighed amount of hydroquinone inhibitor.

When the monomer emulsion, catalyst, and activator feeds were depleted, warm soapy water was pumped through the system in order to flush out any remaining emulsion. This was continued until the exiting liquid was clear. The unit was drained and the volume of water that was obtained was recorded. A volume of approximately 875 to 900 ml indicated no fouling.

Results

A coagulate-free, stable emulsion with a 19.7% solids content and a mean weight average particle diameter of 90 nm was obtained. The polydispersity of the final product was 1.17. Reaction at the end of the reactor totaled 60.2%. The mean residence time in the reactor at the total flow rate of 214.9 ml/min was approximately 7 minutes based on salt tracer studies. The volume of water drained from the emulsion side of the heat exchanger was measured as 893.3 ml signifying that no fouling occurred during the run.

EXAMPLE#3

For this Example, the same equipment was used as in Example 1, except that one pre-mixer was used for the monomer emulsion and another pre-mixer was used for the catalyst and activator solutions. A monomer emulsion was fed to the heated bath. The emulsion in the feed tank was under constant agitation in order to insure homogeneity. The catalyst solution was prepared by combining the following materials: 54.4 g ammonium persulfate, 1033.6 g DI water, and 0.085 g ferrous sulfate heptahydrate. The solution was mixed well and fed to the catalyst feed tank. The activator solution was prepared by combining the following materials: 17.95 g sodium sulfoxylate formaldehyde and 580.4 g DI water. The solution was mixed well and fed to the activator feed tank.

Water was heated to 80° C. The water was pumped through the process lines in order to heat the system. The water entered the bottom of the heat exchanger, and flowed upward through the heat exchanger. The temperature for the "water-side" of the reactor was then set. The water was set to 70° C. Tempered water flow through the "water-side" was begun. The reactor temperature was allowed to equilibrate.

While DI water was still flowing through the process lines, the catalyst pump was turned on to 12.8 ml/min. The activator pump was turned on to 4.2 ml/min. The feeds were checked with graduated cylinders and stop watches to make sure that the feeds were accurate. The DI water flow was turned off. The monomer emulsion feed was begun. The feed rate of the monomer emulsion was adjusted to 200 ml/min. A first pre-mixer was set to a speed such that a stable monomer emulsion was produced. A second pre-mixer was set to a speed such that the catalyst and activator solutions were mixed well with the monomer emulsion, forming a reaction mixture. The temperature of the water in the heating bath was adjusted to insure that the temperature of the reaction mixture at the heat exchanger inlet was approximately 80° C. The monomer was polymerized in the heat exchanger. Polymer was continuously removed from the heat exchanger and collected in the final product holding tank. Samples were added to vials which contained a pre-weighed amount of hydroquinone inhibitor.

When the monomer emulsion, catalyst, and activator feeds were depleted, warm soapy water was pumped through the system in order to flush out any remaining emulsion. This was continued until the exiting liquid was clear. The unit was drained and the volume of water that was obtained was recorded. A volume of approximately 875 to 900 ml indicated no fouling.

Results

A coagulate-free, stable emulsion with a 23% solids content and a mean weight average particle diameter of 90 nm was obtained. The polydispersity of the final product was 1.13. Reaction at the end of the reactor totaled 62.3%. The mean residence time in the reactor at the total flow rate of 217 ml/min was approximately 7 minutes based on salt tracer studies. There was no loss in volume of water between this run and the previous run. This signified that no fouling occurred during the run.

EXAMPLE#4

For this Example, the same equipment as in Example 2 was used. A monomer emulsion was fed from the monomer emulsion feed tank to the heated bath. The emulsion in the feed tank was under constant agitation in order to insure homogeneity. The catalyst solution was prepared by combining the following materials: 10.9 g ammonium persulfate, 79.8 g DI water, and 0.017 g ferrous sulfate heptahydrate. The solution was mixed well and fed to the catalyst feed tank. The activator solution was prepared by combining the following materials: 5.4 g sodium sulfoxylate formaldehyde and 175.9 g DI water. The solution was mixed well and fed to the activator feed tank.

Water was heated to 80° C. The water was pumped through the process lines in order to heat the system. The water entered the bottom of the heat exchanger, and flowed upward through the heat exchanger. The temperature for the "water-side" of the reactor was then set. Tempered water flow through the "water-side" was begun. The reactor temperature was allowed to equilibrate.

While DI water was still flowing through the process lines, the catalyst pump was turned on to 8 ml/min. The activator pump was turned on to 4 ml/min. The feeds were checked with graduated cylinders and stop watches to make sure that the feeds were accurate. The DI water flow was turned off. The monomer emulsion feed was begun. The feed rate of the monomer emulsion was adjusted to 300 ml/min. The temperature of the water in the heating bath was adjusted to insure that the temperature of the emulsion at the heat exchanger inlet was approximately 80° C. Samples were added to vials which contained a pre-weighed amount of hydroquinone inhibitor.

When the monomer emulsion, catalyst, and activator feeds were depleted, warm soapy water was pumped through the system in order to flush out any remaining emulsion. This was continued until the exiting liquid was clear. The unit was drained and the volume of water that was obtained was recorded. A volume of approximately 865 ml indicated no fouling.

Results

A coagulate-free, stable emulsion with a 38% solids content and a mean weight average particle diameter of 90 nm was obtained. The polydispersity of the final product was 1.16. Reaction at the end of the reactor totaled 60.2%. The mean residence time in the reactor at the total flow rate of 300 ml/min was approximately 4.5 minutes based on salt tracer studies. The volume of water drained from the emulsion side of the heat exchanger was measured as 865 ml signifying that no fouling occurred during the run.

EXAMPLE#5

For this Example, the same equipment as in Example 1 was used with the addition of a 20 L aqueous/latex feed tank. A monomer emulsion was fed to the heated bath. An aqueous solution was prepared by combining 2559 g DI water and 142.3 g anionic surfactant. The solution was mixed well and fed to the aqueous/latex feed tank. The catalyst solution was prepared by combining the following materials: 20.7 g ammonium persulfate, 186 g DI water, and 0.018 g ferrous sulfate heptahydrate. The solution was mixed well and fed to the catalyst feed tank. The activator was prepared by combining the following materials 1.6 g sodium sulfoxylate formaldehyde and 52.1 g DI water. The solution was mixed well and fed to the activator feed tank.

Water was heated to 80° C. The water was pumped through the process lines in order to heat the system. The temperature for the "water-side" of the reactor was then set to 70° C. Tempered water flow through the "water-side" was begun. The reactor temperature was allowed to equilibrate.

The DI water flow was stopped and the aqueous flow was started through the process lines at 160 ml/min. The catalyst pump was turned on to 12.2 ml/min. The activator pump was turned on to 3.2 ml/min. The feeds were checked with a beaker, balance and stop watch to make sure that the feeds were accurate. The monomer emulsion feed was begun. The feed rate of the monomer emulsion was adjusted to 40 ml/min. The temperature of the water in the heating bath was adjusted to insure that the temperature of the emulsion at the heat exchanger inlet was approximately 75° C. The monomer emulsion was fed continuously to the heat exchanger. The monomer was polymerized in the heat exchanger. Polymer was continuously removed from the heat exchanger and collected and cooled in the final product holding tank. Samples were added to vials which contained a pre-weighed amount of inhibitor.

When the monomer emulsion feed was depleted, warm soapy water was pumped through the system in order to flush out any remaining emulsion. This was continued until the exiting liquid was clear. The unit was drained and the volume of water that was obtained was recorded. A volume of approximately 850 ml indicated low levels of fouling after 5.5 hours of operation. The polymer product from the holding tank was then charged to the aqueous/latex feed tank.

A second monomer emulsion was fed from the 7.6 L monomer emulsion tank to the heated bath. A second catalyst solution was prepared by combining the following materials: 1.4 g ammonium persulfate, 339 g DI water, and 0.020 g ferrous sulfate heptahydrate. The solution was mixed well and fed to the catalyst feed tank. A second activator solution was prepared by combining the following materials 0.11 g sodium sulfoxylate formaldehyde and 212 g DI water. The solution was mixed well and fed to the activator feed tank Water was heated to 80° C. The water was pumped through the process lines in order to heat the system. The temperature for the "water-side" of the reactor was then set to 70° C. Tempered water flow through the "water-side" was begun. The reactor temperature was allowed to equilibrate.

The DI water flow was stopped and the aqueous/latex flow was started through the process lines at 200 ml/min. The catalyst pump was turned on to 4.0 ml/min. The activator pump was turned on to 2.5 ml/min. The feeds were checked with a beaker, balance and stop watch to make sure that the feeds were accurate. The monomer emulsion feed was begun. The feed rate of the monomer emulsion was adjusted to 40 ml/min. The temperature of the water in the heating batch was adjusted to insure that the temperature of the emulsion at the heat exchanger inlet was approximately 75° C. The monomer emulsion was fed continuously to the heat exchanger. The monomer was polymerized in the heat exchanger. Polymer was continuously removed from the heat exchanger and collected and cooled in the final product holding tank. Samples were added to vials which contained a pre-weighed amount of inhibitor.

When the monomer emulsion feed was depleted, warm soapy water was pumped through the system in order to flush out any remaining emulsion. This was continued until the exiting liquid was clear. The unit was drained and the volume of water that was obtained was recorded. A volume of approximately 750 ml indicated low levels of fouling.

Results

A coagulate-free, stable latex with a 26% solids content and a mean weight average particle diameter of 89 nm was obtained as a final product. The polydispersity of the final product was 1.15. Reaction at the end of the reactor for the final product totaled 77%. The mean residence time in the reactor at the total flow rate of 215–246 ml/min was approximately 7 minutes based on salt tracer studies.

EXAMPLE#6

For this Example, acrylic acid monomer was fed from a 7.6 L monomer tank. The feed tank was equipped with a funnel, a dip pipe, and a weigh scale. A catalyst solution was prepared by admixing 20 g sodium persulfate with 180 g DI water. The solution was mixed well and fed to a 1 L catalyst feed tank (Solution A). An activator solution was prepared by admixing 70 g sodium bisulfite and 130 g DI water. The solution was mixed well and fed to a 1 L activator feed tank (Solution B). A third solution was prepared by admixing 20,000 g DI water with 0.08 g of ferrous sulfate heptahydrate (Solution C).

Water was heated to 65° C. The water was pumped through the process lines in order to heat the system. The water entered the top of the heat exchanger, and flowed downward through the heat exchanger. The temperature for the "water-side" of the reactor was then set. The water was set to 70° C. Tempered water flow through the "water-side" was begun. The reactor temperature was allowed to equilibrate.

While DI water was still flowing through the process lines, a pump was turned on to 5.6 g /min to feed Solution A. A pump was turned on to 8.5 g/min to feed Solution B. The feeds were checked with an electronic balance and stop watches to make sure that the feeds were accurate. The DI water flow was turned off. The monomer and Solution C feeds were begun with a pump. The feed rate of the monomer was adjusted to 40 g/min and the feed rate for Solution C was adjusted to 145.95 g/min. A static mixer was then used to mix the monomer and Solution C. The mixture then passed through a heated bath equipped with a coil to provide residence time for the monomer/Solution C mixture, thermocouples on both the water and the chemical side, a coiled heating element, a Thermolyne Type 1000 stir plate and heater, and a magnetic stir bar. The temperature of the water in the heating bath was adjusted to insure that the temperature of the mixture (Solution C and monomer ) was approximately 55° C. A static mixer was then used to mix the catalyst and activator solutions with the heated monomer/Solution C mixture. The reaction mixture was continuously fed to an Alfa Laval plate-frame heat exchanger (Model Type M6-MFG). The monomer was polymerized in the heat exchanger. Polymer was continuously removed from the heat exchanger and collected in a final product holding tank. Samples were added to vials which contained a pre-weighed amount of inhibitor. A clear polymer solution was made. The conversion was 100% with a residual acrylic acid content of 1000–2000 ppm.

EXAMPLE#7

For this Example, acrylic acid monomer was fed from a 7.6 L monomer tank. The feed tank was equipped with a funnel, a dip pipe, and a weigh scale. A catalyst solution was prepared by admixing 20 g sodium persulfate with 180 g DI water. The solution was mixed well and fed to a 1 L catalyst feed tank (Solution A). An activator solution was prepared by admixing 70 g sodium bisulfite and 130 g DI water. The solution was mixed well and fed to a 1 L activator feed tank (Solution B). A third solution was prepared by admixing 20,000 g of DI water with 0.15 g of ferrous sulfate heptahydrate (Solution C).

Water was heated to 60° C. The water was pumped through the process lines in order to heat the system. The water entered the top of the heat exchanger and flowed downward through the heat exchanger. The temperature for the "water-side" of the reactor was then set. The water was set to 65° C. Tempered water flow through the "water-side" was begun. The reactor temperature was allowed to equilibrate.

While DI water was still flowing through the process lines, a pump was turned on to 8.4 g/min to feed Solution A. A second pump was turned on to 12.7 g/min to feed solution B. The feeds were checked with an electronic balance and stop watches to make sure that the feeds were accurate. The DI water flow was turned off. The monomer and Solution C feeds were begun with a pump. The feed rate of the monomer was adjusted to 60 g/min and the feed rate for Solution C was adjusted to 119 g/min. A static mixer was then used to mix the monomer and Solution C. The mixture then passed through a heated bath equipped with a coil to provide residence time for the monomer/Solution C mixture, thermocouples on both the water and the chemical side, a coiled heating element, a Thermolyne Type 1000 stir plate and heater, and a magnetic stir bar. The temperature of the water in the heating bath was adjusted to insure that the temperature of the mixture (Solution C and monomer) was approximately 52° C. A static mixer was then used to mix the catalyst and activator solutions with the heated monomer/Solution C mixture. The reaction mixture was continuously fed to an Alfa Laval plate-frame heat exchanger (Model Type M6-MFG). The monomer was polymerized in the heat exchanger. Polymer was continuously removed from the heat exchanger and collected in a final product holding tank. Samples were added to vials which contained a pre-weighed amount of inhibitor. A clear polymer solution was made. The conversion was 100% with a residual acrylic acid content of 10–1000 ppm.

EXAMPLE#8

For this Example, vinyl acetate monomer was fed from a 3.8 L monomer tank. The feed tank was equipped a weigh scale. A catalyst solution was prepared by combining the following materials: 4.75 g sodium persulfate, 1233 g DI water, 90 g Abex® 26-S, 170.4 g Polystep® A-16-22, and 1.81 g Sodium bicarbonate. The solution was mixed well and fed to a 1.9 L catalyst feed tank (Solution A). An activator solution was prepared by combining the following materials: 3.35 g sodium sulfoxylate formaldehyde ("SSF"), 0.07 g of ferrous sulfate heptahydrate, 0.15 g Versene®, and 996.4 g DI water. The solution was mixed well and fed to a 1.9 L activator feed tank (Solution B). An aqueous solution was prepared by combining the following materials: 508 g DI water, 161.6 g Abex® 26-S, 306 g Polystep® A-16-22, and 24.4 g sodium vinyl sulfonate ("SVS"). The solution was mixed well and then fed into a 1.9 L tank aqueous feed tank (Solution C).

The system pressure was set to 500 psig. DI water was heated to 78° C. and pumped through the process lines in order to heat the system. The water entered the top of the heat exchanger and flowed downward through the exchanger. The tempered water flow was started on the "water-side" of the reactor and the temperature was set to 70° C. The reactor temperature was allowed to equilibrate.

The DI water flow was set to feed 6.1 g/min and pumps were turned on to feed 5.3 g/min of Solution A, 2.6 g/min of Solution B, and 2 g/min of Solution C. A pump was turned on to feed 3.8 g/min of the monomer and a pre-mixer was set to a speed such that a stable monomer emulsion was produced. The flow rates were checked with an electronic balance and stop watches to make sure that the feeds were accurate. After 30 minutes of running vinyl acetate through the system, ethylene was added to the Solution C/monomer stream at a flow rate of 0.2 g/min for a period of approximately 45 minutes. The flow was then stepped up to 0.3 g/min for the remainder of the experiment (approximately 1 hour and 30 minutes). Solution C, monomer and ethylene passed through a pipe in pipe heat exchanger and the DI water passed through a separate pipe in pipe heat exchanger only to heat the solutions. The flows were then mixed in a static mixer and maintained at a combined temperature of approximately 60° C. A static mixer was then used to mix the Solution A, Solution C, monomer, and DI water streams. A second static mixer mixed Solution B with the previous combined streams. The reaction mixture was continuously fed to a Tranter Maxchanger (Model #-MX-06-0424-HP-012) plate heat exchanger. The monomer was polymerized in the plate heat exchanger. Polymer was continuously removed from the heat exchanger and collected in a final product holding tank. Samples were added to vials which contained a pre-weighed amount of inhibitor.

When the monomer emulsion, catalyst, and activator feeds were depleted, soapy water, then water was pumped through the system to flush out any remaining emulsion. This was continued until the exiting liquid was clear. The unit was depressurized and drained and the volume of water that was obtained was recorded. A volume of approximately 550 ml indicated no fouling.

Results

A latex was made with a conversion of approximately 90%. The polydispersity of the final product was 1.33. Latex samples were dried in the hood at room temperature and polymer samples were obtained. Polymer samples were analyzed by DSC and NMR. The glass transition temperature (Tg) of the polymer as determined by DSC was 39° C. for the vinyl acetate latex and 28° C. and 23° C. respectively for the vinyl acetate/ethylene latex with 0.2 g/min and 0.3 g/min ethylene feed rates.

The 1H NMR spectra were acquired on a Varian INOVA 600 MHz NMR spectrometer. The ethylene content in the dry polymer from the latex was determined to be 12.2 mole % at 0.2 g/min ethylene feed rate and 14.6 mole % at 0.3 g/min ethylene feed rate.

EXAMPLE#9

For this Example, monomer (Styrene) was fed from a 3.8 L monomer tank. The feed tank was equipped a weigh scale. A catalyst solution was prepared by combining the following materials: 4.19 g sodium persulfate, 1078.05 g DI water, 4.99 g tertiary butyl hydroperoxide, and 412.78 g Polystep A-16-22. The solution was mixed well and fed to a 1.9 L catalyst feed tank (Solution A). An activator solution was prepared by combining 5.79 g SSF and 873.56 g DI water. The solution was mixed well and fed to a 1.9 L activator feed tank (Solution B). An aqueous solution was prepared by combining the following materials: 369.82 g DI water, 612.42 g Polystep A-16-22 and 17.76 g SVS. The solution was mixed well and fed into a 1.9 L aqueous feed tank (Solution C). A second aqueous solution was prepared by combining the following materials: 0.13 g of ferrous sulfate heptahydrate, 6499.87 g of DI water and one drop of 98% $H_2SO_4$ (Solution D).

The system pressure was set to 200 psig and Solution D was heated to 78° C. Solution D was pumped through the process lines in order to heat the system. Solution D entered the top of the heat exchanger, and flowed downward through the exchanger. The tempered water flow was started on the "water side" of the reactor and the temperature was set to 70° C. The reactor temperature was allowed to equilibrate.

Solution D flow was set to feed 5.7 g/min and pumps were turned on to feed 5.6 g/min of Solution A, 2.4 g/min of Solution B, and 2.6 g/min of Solution C. A pump was turned on to feed 3.5 g/min of the monomer and a pre-mixer was set to a speed such that a stable monomer emulsion was produced. The flow rates were checked with an electronic balance and stop watches to make sure that the feeds were accurate. After 30 minutes of running styrene through the system, butadiene was added to the Solution C/monomer stream at a flow rate of 0.52 g/min. Solution C, monomer and butadiene passed through a pipe in pipe heat exchanger for mixing purposes only, and Solution D passed through a separate pipe in pipe heat exchanger for mixing purposes only. The flows were then mixed in a static mixer and maintained at a combined temperature of approximately 60° C. A static mixer was then used to mix Solution A with the Solution C, monomer, and Solution D streams. A second static mixer mixed Solution B with the previous combined streams. The reaction mixture was continuously fed to a Tranter Maxchanger (Model #-MX-06-0424-HP-012) plate heat exchanger. The monomer was polymerized in the heat exchanger. Polymer was continuously removed from the plate heat exchanger and collected in a final product holding tank. Samples were added to vials which contained a pre-weighed amount of inhibitor.

When the monomer emulsion, catalyst, and activator feeds were depleted, soapy water, then water was pumped through the system to flush out any remaining emulsion. This was continued until the exiting liquid was clear. The unit was depressurized and drained and the volume of water that was obtained was recorded. A volume of approximately 543 ml indicated no fouling.

Results

A latex was made with a conversion of approximately 76%. The polydispersity of the final product was 1.51. Latex samples were dried in the hood at room temperature and polymer samples were obtained. Polymer samples were sent for NMR analysis. The butadiene content in the dry polymer from latex was determined to be 3.3 mole % butadiene by NMR.

The above examples demonstrate that the process is effective at converting monomer reaction mixtures into polymers with both thermal and redox initiation in a continuous process. Products obtained from the process had polydispersity indexes of 1.5 or less. Therefore, the process provides polymers with narrow particle size distributions.

What is claimed:

1. A continuous process for preparing polymers comprising:
   continuously feeding at least one reaction mixture containing at least one monomer to at least one non-cylindrical channel;
   continuously controlling the temperature of the at least one non-cylindrical channel by exposing the surface of the at least one non-cylindrical channel not exposed to the at least one monomer to a temperature control medium;
   polymerizing the at least one monomer in the at least one non-cylindrical channel by emulsion polymerization, solution polymerization, or suspension polymerization; and continuously removing the polymer from the at least one non-cylindrical channel;
   wherein the temperature of the at least one non-cylindrical channel is continuously controlled by continuously feeding the temperature control medium to separate non-cylindrical channels alternating with the at least one non-cylindrical channel in which the reaction mixture flows.

2. The process according to claim 1 wherein the reaction mixture containing at least one monomer comprises an emulsion prepared by admixing at least one monomer, at least one initiator, at least one surfactant, and water.

3. The process according to claim 2 wherein the emulsion prepared by admixing at least one monomer, at least one initiator, at least one surfactant, and water is stabilized by a mixer selected from a static mixer and a pre-mixer.

4. The process according to claim 1 wherein the reaction mixture containing at least one monomer comprises a solution prepared by admixing at least one monomer, at least one initiator, and at least one solvent.

5. The process according to claim 4 wherein the at least one solvent is selected from acetone, water, ethanol, methanol, butanol, isopropanol, propylene glycol monobutyl ether, ethylene glycol monobutyl ether, methylethyl ketone, dimethylformamide, and dimethylsulfoxide.

6. A continuous process for preparing polymers comprising:
   continuously feeding at least one reaction mixture containing at least one monomer to at least one non-cylindrical channel;
   continuously controlling the temperature of the at least one non-cylindrical channel by exposing the surface of the at least one non-cylindrical channel not exposed to the at least one monomer to a temperature control medium;
   polymerizing the at least one monomer in the at least one non-cylindrical channel by emulsion polymerizations solution polymerization, or suspension polymerization; and continuously removing the polymer from the at least one non-cylindrical channel;
   wherein the at least one non-cylindrical channel is formed by plates.

7. The process according to claim 6 wherein:
   the at least one non-cylindrical channel is a plate-frame, plate-fin, or spiral-plate heat exchanger.

8. The process according to claim 7 wherein:
   the at least one non-cylindrical channel is a plate-frame heat exchanger.

9. The process according to claim 6 wherein the reaction mixture containing at least one monomer comprises an emulsion prepared by admixing at least one monomer, at least one initiator, at least one surfactant, and water.

10. The process according to claim 9 wherein the emulsion prepared by admixing at least one monomer, at least one initiator, at least one surfactant, and water is stabilized by a mixer selected from a static mixer and a pre-mixer.

11. The process according to claim 6 wherein the reaction mixture containing at least one monomer comprises a solution prepared by admixing at least one monomer, at least one initiator, and at least one solvent.

12. The process according to claim 11 wherein the at least one solvent is selected from acetone, water, ethanol, methanol, butanol, isopropanol, propylene glycol monobutyl ether, ethylene glycol monobutyl ether, methylethyl ketone, dimethylformamide, and dimethylsulfoxide.

13. A continuous process for preparing polymers comprising:
   continuously feeding at least one reaction mixture containing at least one monomer to at least two non-cylindrical channels;
   continuously controlling the temperature of the at least two non-cylindrical channels by exposing the surfaces of the at least two non-cylindrical channels not exposed to the at least one monomer to a temperature control medium;
   polymerizing the at least one monomer in the at least two non-cylindrical channels by emulsion polymerization, solution polymerization, or suspension polymerization; and continuously removing the polymer from at least one of the at least two non-cylindrical channels; wherein the at least two non-cylindrical channels are connected in series or in parallel.

14. The process according to claim 13 wherein at least two of the non-cylindrical channels are operated at different temperatures.

15. The process according to claim 13 wherein at least one reaction mixture containing at least one monomer comprises an emulsion prepared by admixing at least one monomer, at least one initiator, at least one surfactant, and water.

16. The process according to claim 15 wherein the emulsion prepared by admixing at least one monomer, at least one initiator, at least one surfactant, and water is stabilized by a mixer selected from a static mixer and a pre-mixer.

17. The process according to claim 13 wherein at least one reaction mixture containing at least one monomer comprises a solution prepared by admixing at least one monomer, at least one initiator, and at least one solvent.

18. The process according to claim 17 wherein the at least one solvent is selected from acetone, water, ethanol, methanol, butanol, isopropanol, propylene glycol monobutyl ether, ethylene glycol monobutyl ether, methylethyl ketone, dimethylformamide, and dimethylsulfoxide.

* * * * *